(12) United States Patent
Jang et al.

(10) Patent No.: US 9,023,934 B2
(45) Date of Patent: May 5, 2015

(54) PAINT COMPOSITION HAVING SCRATCH SELF-RECOVERING PROPERTIES

(71) Applicants: Hyundai Motor Company, Seoul (KR); Kia Motors Corporation, Seoul (KR); Noroobee Chemical Co., Ltd., Cheonan, Chungcheongnam-Do (KR)

(72) Inventors: Seon-Ho Jang, Gyeonggi-do (KR); Soon-Joon Jung, Seoul (KR); Kie-Youn Jeong, Gyeonggi-do (KR); Ho-Tak Jeon, Gyeonggi-do (KR); Young-Hun Choi, Chungcheongnam-do (KR); Dae-Geun Oh, Chungcheongnam-do (KR); Young-Seok Kim, Chungcheongnam-do (KR); Jae-Beom Ahn, Gyeonggi-do (KR)

(73) Assignees: Hyundai Motor Company, Seoul (KR); Kia Motors Corporation, Seoul (KR); Noroobee Chemical Co., Ltd., Cheonam (KR)

( * ) Notice: Subject to any disclaimer, the term of this patent is extended or adjusted under 35 U.S.C. 154(b) by 0 days.

(21) Appl. No.: 14/144,962

(22) Filed: Dec. 31, 2013

(65) Prior Publication Data
US 2015/0011694 A1    Jan. 8, 2015

(30) Foreign Application Priority Data

Jul. 5, 2013  (KR) .................. 10-2013-0079145

(51) Int. Cl.
*C08L 67/00* (2006.01)
*C09D 133/00* (2006.01)
*C09D 167/02* (2006.01)

(52) U.S. Cl.
CPC ............ *C09D 133/00* (2013.01); *C09D 167/02* (2013.01)

(58) Field of Classification Search
USPC ................................................. 524/357, 513
See application file for complete search history.

(56) References Cited

U.S. PATENT DOCUMENTS 6,306,508 B1    10/2001    Black et al.
2007/0202341 A1*   8/2007   Dogan et al. ............... 428/423.1

FOREIGN PATENT DOCUMENTS

JP       10-338769       12/1998
KR   10-2011-0137959    12/2011

* cited by examiner

*Primary Examiner* — Edward Cain
(74) *Attorney, Agent, or Firm* — Mintz Levin Cohn Ferris Glovsky and Popeo, P.C.; Peter F. Corless

(57) ABSTRACT

Disclosed is a paint composition, and more specifically, a scratch self-recovering paint composition having a shortened drying time and extended pot life, which comprises about 30~40% by weight of a branched polyester resin; about 30~40% by weight of an acryl polyol resin; about 0.2~0.5% by weight of a reaction catalyst; and about 0.99~9.0% by weight of a reaction retardant, based on the total weight of the paint composition.

8 Claims, 1 Drawing Sheet

PAINT COMPOSITION HAVING SCRATCH SELF-RECOVERING PROPERTIES

CROSS-REFERENCE TO RELATED APPLICATION

This application claims under 35 U.S.C. §119(a) the benefit of Korean Patent Application No. 10-2013-0079145 filed on Jul. 5, 2013, the entire contents of which are incorporated herein by reference.

BACKGROUND (a) Technical Field

The present disclosure relates to a paint composition having a controllable curing rate and which is provided with scratch self-recovering properties. More specifically, the paint composition of the present invention has a shortened drying time and an extended a pot life, particularly by comprising a combination of a branched polyester resin, acryl polyol resin, curing agent, photostabilizer and reaction catalyst, etc.

(b) Background Art

Recently, there has been an increasing demand for providing vehicle interior parts with a black high gloss finish. However, any scratches occurring in the high gloss finish lowers the vehicle's commercial value and is a cause of increasing consumer complaints.

Generally, most of the scratches occurring on car interior parts, etc. are to the result of normal wear and tear by consumers. Therefore, studies for minimizing the occurrence of scratches are ongoing in order to maintain the desired appearance of the car interior parts.

In connection with this, a method that attempts to avoid the occurrence of a scratch by increasing hardness of a paint film, or by increasing hardness using nano size silica or alumina, is described in Japanese Laid-open Patent Publication No. 2000-293895. However, these methods have only a limited ability to preventing scratches. As such, the problem of scratching has not been adequately addressed.

Korean Patent Publication No. 10-0643335 describes a material having a scratch self-recovering performance by using elasticity of an urethane molecular structure made by reacting acryl, aliphatic polyester, etc. with isocyanate. However, with the described composition, physical properties of the coating are decreased, and the coating does not satisfy the physical properties required for use on interior parts of motor vehicles. Further, the drying rate of the described composition is decreased, and there is a problem that the composition is difficult to use in the industry.

SUMMARY OF THE DISCLOSURE

The present invention has been made in an effort to solve the above-described problems associated with the prior art. More particularly, the present invention provides a paint composition that makes it possible to shorten the drying time and to control the pot life thereof. In particular, the present invention provides such advantages by expediting a reaction, by using a branched polyester resin to maximize elasticity, using a hard acryl polyol resin to improve physical properties, using a curing agent to improve a curing rate, and using a reaction catalyst to promote a reaction, etc.

According to one aspect, the present invention provides a scratch self-recovering paint composition that comprises about 30~40% by weight of branched polyester resin; about 30~40% by weight of acryl polyol resin; about 0.2~0.5% by weight of a reaction catalyst; and about 0.99~9.0% by weight of a reaction retardant, relative to a total weight of said paint composition. According to the present invention, the paint composition has a shortened drying time and an extended pot life relative to conventional compositions.

The various materials used as the reaction catalyst and reaction retardant are not particularly limited and are generally any that are compatible with the other components. According to preferred embodiments, the reaction catalyst is dibutyl tin dilaurate, and the reaction retardant is a diketone compound. One exemplary diketone compound particularly suitable for use in the present composition is 2,4-pentanedione.

It is preferable that the paint composition additionally comprises about 20~30% by weight of a curing agent for the curing of the painting composition, relative to a total weight of said paint composition. Any conventional curing agent may suitably be used, and according to preferred embodiments, the curing agent is a hexamethylene diisocyanate trimer and hexamethylene diisocyanate allopanate trimer are mixed in a suitable weight ratio, for example a weight ratio of about 1:1~3.

It is further preferable that the paint composition comprises about 0.5~2% by weight of a photostabilizer to avoid aging and/or discoloration, etc. of the paint film due to a long-period of exposure to light. Any conventional photostabilizer may suitably be used, and according to preferred embodiments, the photostabilizer is Tinuvin® 400 (a liquid hydroxyphenyl-triazine (HPT) UV absorber) and Tinuvin® 292 mixed in a suitable weight ratio, for example, a weight ratio of about 2~3:1.

The effect of the present invention having said constitution can maximize a recovering power which is provided through elasticity of the composition, particularly by maximizing a urethane bond compared to a conventional polyester resin. According to particularly preferred embodiments, this is accomplished by using a branched polyester resin and a multi-functional isocyanate.

As referred to herein "self-recovering" refers to a property wherein a scratch, defect, etc. (wherein self-recovering scratches, defects, etc. are collectively referred to herein as a "scratch"), that is formed in a paint film/coating is automatically repaired over time without any external energy after the paint has been fully cured. The paint composition of the present invention has a further advantage in that it is provided with physical properties that meet the required level for application to car interior materials, particularly by inclusion of an acryl polyol resin, etc. which is a hard resin.

Furthermore, the paint composition of the present invention has an effect in that a drying time of the composition can be shortened by using a catalyst, and further that the pot life can also be extended.

In addition, the paint composition of the present invention is beneficial because it provides multiple advantages such as, an extension of the pot life, increasing the life of the coated interior material by providing self-recovering properties of scratches and other defects, and the high gloss finish of the interior material can be maintained for a long period of time without any additional costs (e.g. for repair, replacement), and the like.

Other features and aspects of the present invention will be apparent from the following detailed description, drawings and claims.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
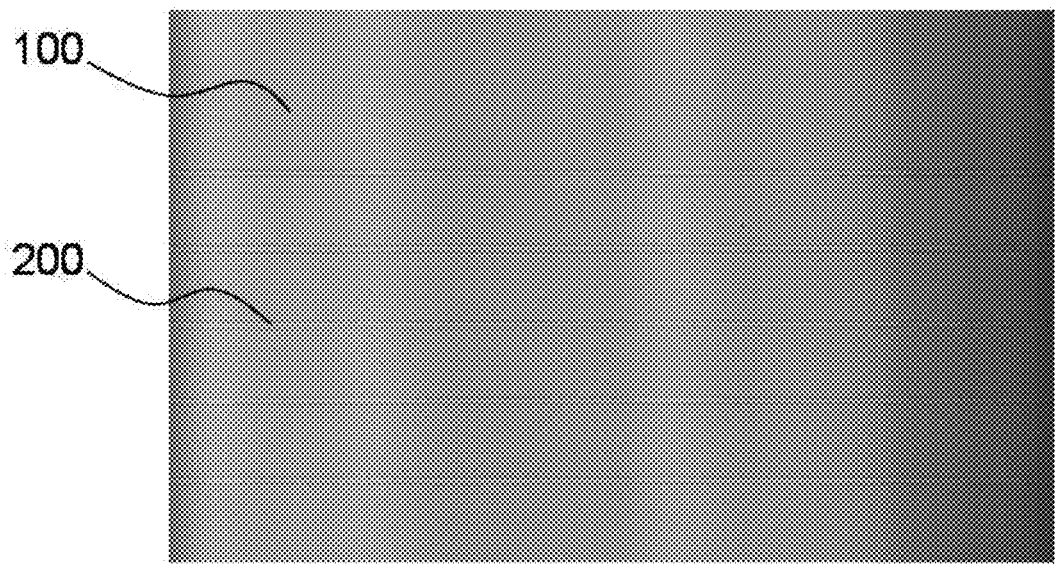
FIG. 1 is a surface photograph of a specimen to which the paint composition according to an embodiment of the present invention is applied wherein a scratch is made artificially.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below.

The terms or words used in the specification and claims of the present application should not be interpreted as being limited as a conventional or dictionary meaning, and should be interpreted as the meaning and concept that accord with the technical spirit on the grounds of principle that the inventor can appropriately define the concept of the term in order to explain his invention with the best ways.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, the present intention is illustrated in detail.

The present invention relates to a paint composition which has a function in that a scratch, defect etc. that has been formed in the applied paint composition (e.g. film or coating of the paint) is self-recovered over time. According to embodiments of the present invention, the paint composition comprises a branched polyester resin, acryl polyol resin, curing agent, photostabilizer and reaction catalyst. Further additional optional components as further described below may also be included, if desired.

The paints and varnishes comprising a paint or enamel, etc. are a mixture of a resin, pigment, curing agent and dispersing agent, and, as a general term, relate to flowable materials which make a solid film that protects a surface and makes it beautiful, upon painting the surface.

A polyurethane paint and varnish is a general term that relates to paints and varnishs having a urethane bond, and is classified into an alkyd polyol, a polyester polyol, a polyester modified acryl polyol and an acryl polyol, etc., depending upon the purpose of use.

The present invention provides a paint in which the hydroxy group (—OH) of a polyester polyol resin and acryl polyol resin is reacted with an isocyanate group (—NCO) to form a urethane bond (—NHCOO—). This provides a polyurethane paint and varnish that improves the physical properties of the paint film.

The polyurethane paint and varnish of the present invention has a property through which the paint strongly recovers its original state even after the polyurethane paint and varnish is deformed (modified) due to a scratch, etc. by an external force. In particular, the present paint recovers its original state due to the flexibility of the paint film which is increased by forming a three-dimensional network structure by a chemical bond between molecules after curing. Further, the present paint composition has good durability against deformation or heat compared to a thermoplastic elastomer, and provides a paint film having an excellent appearance and an excellent painting workability.

Hereinafter, the constitutional components and the contents of the present paint film are illustrated in further detail.

1. Constitutional Components (1) Branched Polyester Resin

In general, a polyester resin is obtained by a condensation reaction of an acid component, such as polyhydric carboxylic acid and/or the acid anhydride thereof, and polyhydric alcohol.

As an acid component constituting the polyester resin of the present invention, a polybasic acid component is generally use and, in some embodiments, a monocarboxylic acid is used. The polybasic acid component includes an aromatic dicarboxylic acid, aliphatic dicarboxylic acid or alicyclic dicarboxylic acid, and the like.

Specifically, the aromatic dicarboxylic acid preferably includes terephthalic acid, isophthalic acid, phthalic acid, anhydrous phthalic acid, naphthalene dicarboxylic acid or biphenyl dicarboxylic acid, and the like.

Also, the aromatic dicarboxylic acid preferably includes a saturated aliphatic dicarboxylic acid such as oxalic acid, malonic acid, succinic acid, anhydrous succinic acid, glutaric acid, adipic acid, pimelic acid, suberic acid, azelic acid, sebacic acid or dodecanic 2 acid, and hydrogenated dimeric acid, and the like, and an unsaturated aliphatic dicarboxylic acid such as fumaric acid, maleic acid, anhydrous maleic acid, itaconic acid, anhydrous itaconic acid, citraconic acid, anhydrous citraconic acid or dimeric acid, and the like.

Further, the alicyclic dicarboxylic acid preferably includes 1,4-cyclohexanedicarboxylic acid, 1,3-cyclohexanedicarboxylic acid, 1,2-cyclohexanedicarboxylic acid, 2,5-norbonenedicarboxylic acid, anhydrous 2,5-norbonenedicarboxylic acid, tetrahydrophthalic acid or anhydrous tetrahydrophthalic acid, and the like.

As an alcohol component constituting the polyester resin, a multivalent alcoholic component is generally used, and, if desired, a mono alcohol can be used. The multivalent alcohol component can include, for example, aliphatic glycol, alicyclic glycol or ether bond-containing glycol, and the like.

According to preferred embodiments, the aliphatic glycol includes ethylene glycol, 1,2-propanediol, 1,3-propanediol, 1,4-butanebiol, 2-methyl-1,3-propanediol, 1,5-pentanediol, neopentylglycol, 1,6-hexanediol, 3-methyl-1,5-pentanediol, 1,9-nonanediol or 2-ethyl-2-butylpropanediol, and the like.

In addition, the alicyclic glycol preferably includes 1,4-cylcohexanedimethanol, and the like.

According to various embodiments, the ether bond-containing glycol may include an ethylene oxide adduct of bisphenol class (bisphenol A), such as diethylene glycol, triethylene glycol, dipropylene glycol, and 2,2-bis[4-(hydroxyethoxy)phenyl]propane, an ethylene oxide adduct of bisphenol class (bisphenol S), such as bis[4-(hydroxyethoxy)phenyl]sulfone, a polyethylene glycol, a polypropylene glycol or a polytetramethylene glycol, and the like.

Meanwhile, since there is a difficulty in synthesizing a branched polyester resin with only a difunctional alcohol compound, it is preferred that at least one among the branched monomers, such as a trifunctional or more of glycerin, trimethyol ethane, trimethylol propane and petaerythriol, etc., are included.

Another example of the branched monomer includes, but is not limited to multifunctional acid or glycol, etc., for example, trimelitic acid, trimelitic acid anhydride, pyromelitic acid dianhydride, trimethylolpropane, glycerol, pentaerythrotiol, citric acid, tartaric acid or 3-hydroxy glutaric acid, and the like.

Preferably, the branched monomer includes at least one component selected from the group consisting of trimelitic acid anhydride, pyromelitic acid anhydride, glycerol, sorbitol, 1,2,6-hexane triol, pentaerythritol, trimethylol ethane and trimesic acid.

Such a branched polyester resin can provide a self-recovering performance, wherein an initial state of the coated paint composition can be recovered by elasticity upon formation of a scratch. In particular, such self-recovering occurs through a composition in which a urethane structure is formed after reacting with polyisocyanate.

In this case, the branched polyester resin is preferably included in the composition in an amount of about 30~40% by weight, based on the total weight of the paint composition, more preferably about 35% by weight. It is further preferred that the weight average molecular weight of the branched polyester resin is about 4,000~7,000, and the hydroxyl content is preferably about 4~6%, relative to the total weight of the branched polyester resin.

If the branched polyester resin is included in the composition in an amount less than 30% by weight, the physical properties of the paint composition are improved, but the recovering performance from scratches/defects is difficult to achieve. On the other hand, and the amount of the branched polyester resin exceeds 40% by weight, the workability may be decreased due to the occurrence of stickiness of the paint film, and it is difficult to make a sufficient urethane bond under the general drying condition due to a decrease of the reactivity.

(2) Acryl Polyol Resin

The acyl polyol resin is a polymer which an acryl monomer having a hydroxyl group (—OH), styrene monomer, etc. are copolymerized. In general, an acryl polyol resin can be prepared via a solution polymerization procedure of various polymerizable monomers and acryl monomers having hydroxyl groups, carried out in the presence of a radical polymerization initiator. The physical properties of a paint composition including an acryl polyol resin are affected by the type of acryl monomer used, the compositional ratio (i.e. relative amount of acryl monomer added), molecular weight and hydroxyl value, etc. In general, such paint compositions including an acryl polyol resin are provided with characteristics such as a fast drying time, excellent weather resistance, excellent chemical resistance and excellent mechanical properties, etc.

Such an acryl polyol resin plays a role in supplementing physical properties lacking in the branched polyester resin component, and can, thus, provide the requisite physical properties for application to the lining/interior parts of motor vehicles by an appropriate combination of components.

According to various embodiments, the acryl resin is preferably included in an amount of about 30~40% based on the total weight of the paint composition. If the amount of the acryl resin is less than 10% by weight, the stickiness of the composition is increased and, thus, the hardness of a coating formed therefrom can be decreased. On the other hand, if the amount of the acryl resin is greater than 30% by weight, the recovering performance of a scratch is decreased and the cracks in the paint film can result from impact and bending of the film.

According to various embodiments, it is preferable to use an acryl resin having a weight average molecular weight (Mw) within a range of about 6,000~15,000, an acid value of about 3~10 mg/KOH, a hydroxyl content of about 1~5% and, a glass transition temperature of about 40~50° C. to minimize the adhesion of the paint film. Preferably, the acryl resin has solid content of about 40% by weight or more, based on the weight of the acryl resin. According to a preferred embodiment, the acryl resin is a product prepared by a radical solution polymerization of monomers having a vinyl-type double bond, such as acrylic acid ester and methacrylic acid ester, through the use of a thermo decomposition initiator.

(3) Curing Agent

The above curing agent is added to assist in curing the paint composition. Any conventional curing agent may suitably be used. According to, preferred embodiments, the curing agent is a mixture of a hexamethylene diisocyanate trimer (HDI trimer) having an excellent pyrite-free denaturation and weatherability, and a hexamethylene diisocyanate allophanate trimer (HDI allophanate trimer, preferably, having 4~4.5 of NCO functional group). Preferably, the weight ratio of HDI trimer to HDI allophanate trimer is about 1:1~3 to improve a curing rate.

According to preferred embodiments, the above curing agent is included in the paint composition in an amount of about 20~30% by weight, more preferably about 28% based on the total weight of the paint composition. If the curing agent is included in an amount less than 20% by weight, hardening of the paint composition does not occur, and it is difficult to secure a physical property of a film. On the other hand, if the amount of curing agent comprises greater than 30% by weight, a pot life of the paint composition is shortened, and it is difficult to work with the paint composition.

(4) Photostabilizer

A photostabilizer prevents aging and/or discoloration of a paint film which can result from long-term exposure to light, and plays a role in ultraviolet blocking, absorption and conversion of light energy, a removal function of free radicals, etc. Any conventional photostabilizer that provides such properties may suitably be used. According to preferred embodiments, the photostabilizer is preferably one in which UV absorbers and UV hindered amine photostabilizers are mixed. The class of V hindered amine photostabilizers used is preferably an organic amine-based compound having UV absorbers and a steric hindrance effect.

Any conventional UV absorber-based photostabilizer and amine photostabilizer may suitably be used. According to preferred embodiments, the UV absorber-based photostabilizer is selected from bezophenone-based, oxaanilide-based, benzotriazol-based or triazine-based, etc., and the amine photostabilizer is selected from 4-benzoyloxy-2,2,6,6-tetramethylbipheridine or 2,4-di-tert-buthylphenyl-3,5-di-tert-butyl-hydroxybenzoid, etc.

More preferably, a mixture of 2~3:1 of Tinuvin 400 and Tinuvin 292 is used.

It is preferable that the above photostabilizer is included in an amount of about 0.5~2 wt % based on the total weight of the paint composition. When the amount of photostabilizer is less than 0.5% by weight, there are problems in that the film is easily yellowed over time and a gloss is decreased over time. On the other hand, when the amount of photostabilizer is greater than 2% by weight, it can cause a paint shortage to become unstable.

(5) Reaction Catalyst

Generally, car interior materials are composed of plastic materials, and since there is a possibility that a deformation of the plastic materials occurs upon drying after coating them, a low-temperature curing (at below 80° C.) is carried out to prevent such deformation. Further, a two-package type of acrylic urethane reaction is usually carried out, where two packages of paint are kept separately up until the reaction occurs, and a drying time takes about 30 minutes to improve a productivity.

The above reaction catalyst plays a role in improving a reaction rate of a hydroxyl group (—OH group) contained in a resin and a isocyanate group (—NCO group) contained in a curing agent to sufficiently crosslink a urethane under the above conditions. Any conventional catalysts suitable for such a role can be used, and, for example, the catalyst can comprise dibuthyl tin dilaurate, etc.

In this case, the above reaction catalyst is preferably included in the paint composition in an amount of about 0.2~0.5% based on the total weight of the paint composition. When the amount of reaction catalyst comprises less than 0.2% by weight, an improvement of the reaction rate cannot be greatly expected, and when it comprises greater than 0.5% by weight, an appearance quality of the coating can be decreased.

(6) Reaction Retardant

Since the branched polyester resin used in the self-recovering paint has a high content of a hydroxyl group and a relatively a slower reaction rate than acryl resin, an excess amount of a reaction catalyst (about 0.2~0.5% by weight) is required to improve a reaction rate. However this results in shortening of the paint composition's pot life and, thus, workability may be decreased.

Therefore, it is preferably to add about 0.99~9.0% by weight of reaction retardant to prevent excess reaction in the present invention. Any known reaction retardants can suitably be used, and according to preferred embodiments, a diketone compound is used as the reaction retardant.

The diketone compound refers to a compound having two ketonic carbonyl groups in one molecule, and according to the relative positions of two ketonic groups, it is variously classified into 1,2- (or α-), 1,3- (or β-) and 1,4-diketone, etc. and comprises butanedione, hexanedione, etc. Preferably, the present invention uses 2,4-pentanedione, etc. as the above diketone compound.

According to preferred embodiments, the reaction retardant is preferably included in an amount of about 0.99~9.0% compared to the total weight of the paint composition. If the amount of reaction retardant is less than 0.99% by weight, it is difficult to secure the pot life required in the present invention, and if is greater than 9.0% by weight, the reaction is greatly delayed and, thus, workability may be decreased.

2. Use

The paint composition according to the present invention is provided which is suitable for various applications, and is preferably used for coating car interior parts.

According to embodiments of the present invention, when the paint composition of the present invention is used, a pot life of the paint can be increased.

Hereinafter, the present invention will be illustrated in detail by means of Examples. It is self-evident to those having ordinary knowledge in the art that these Examples are only to exemplify the present invention, and the scope of the present invention is not construed as being limited by these Examples.

EXAMPLES

Constitutional components and contents for specimens of the Examples and Comparative Examples are represented in Table 1 below, and the physical properties and pot life are summarized in Tables 2 and 3 below, respectively.

TABLE 1

| | Contents (% by weight) | | | | | | | | |
|---|---|---|---|---|---|---|---|---|---|
| Section | Ex. 1 | Comparative Ex. 1 | Comparative Ex. 2 | Comparative Ex. 3 | Comparative Ex. 4 | Comparative Ex. 5 | Comparative Ex. 6 | Comparative Ex. 7 | Comparative Ex. 8 |
| Polyester Polyol | 0 | 34 | 0 | 0 | 0 | 0 | 0 | 0 | 0 |
| Branched Polyester Resin | 34 | 0 | 34 | 34 | 34 | 34 | 34 | 34 | 32.69 |
| Acryl Polyol | 34 | 34 | 34 | 34 | 34 | 34 | 34 | 34 | 32.69 |
| Curing Agent-1 | 14 | 14 | 28 | 0 | 14 | 14 | 14 | 14 | 13.46 |
| Curing Agent-2 | 14 | 14 | 0 | 28 | 14 | 14 | 14 | 14 | 13.46 |
| Reaction Catalyst | 0.3 | 0.3 | 0.3 | 0.3 | 0.3 | 0 | 0 | 0.1 | 0.67 |

TABLE 1-continued

| | | Contents (% by weight) | | | | | | | |
|---|---|---|---|---|---|---|---|---|---|
| Section | Ex, 1 | Comparative Ex. 1 | Comparative Ex. 2 | Comparative Ex. 3 | Comparative Ex. 4 | Comparative Ex. 5 | Comparative Ex. 6 | Comparative Ex. 7 | Comparative Ex. 8 |
| Reaction Retardant | 2.7 | 2.7 | 2.7 | 2.7 | 0 | 3.0 | 0 | 0.9 | 6.06 |
| Photo Stabilizer | 1.0 | 1.0 | 1.0 | 1.0 | 1.0 | 1.0 | 1.0 | 1.0 | 0.97 |
| Solvent | 0 | 0 | 0 | 0 | 2.7 | 0 | 3 | 2 | 0 |
| Total | 100 | 100 | 100 | 100 | 100 | 100 | 100 | 100 | 100 |

1) Curing agent-1: HDI Trimer (Trade name: Desmodur N 3300)
2) Curing agent-2: HDI Allophanate Trimer (Trade name: Desmodur XP-2679)
3) Photostabilizer: UVA (Tinuvin 400) and HALS (Tinuvin 292) are mixed with the ratio of 2:1.
4) Reaction catalyst: dibuthyl tin dilaurate
5) Reaction retardant: 2,4-pentanedion
6) Solvent: buthylacetate The above Table 1 represents a comparison of constitutional components and contents of Examples according to the present invention and Comparative Examples.

As represented in the above Table, Example 1 used a branched polyester resin and acryl polyol resin as one example of a composition according to the present invention. The composition included a multifunctional curing agent, and used dibuthyl tin dilaurate together with 2,4-pentanedion.

A drying condition of a paint film for identifying the physical properties was carried out for 30 minutes at 80° C., which is generally the drying condition for coating a plastic material. The physical properties of each of the paint compositions were then determined and are summarized in Table 2, and the results for the pot life of the paint compositions were also determined and are summarized in Table 3.

TABLE 2

| | Ex. 1 | Comparative Ex. 1 | Comparative Ex. 2 | Comparative Ex. 3 | Comparative Ex. 4 | Comparative Ex. 5 | Comparative Ex. 6 | Comparative Ex. 7 | Comparative Ex. 8 |
|---|---|---|---|---|---|---|---|---|---|
| Elasticity recovery rate (%) | 100 | 100 | 80 | 100 | 100 | Not yet dried | Not yet dried | 100 | 100 |
| Elasticity recovery time (min) | 1.0 | 60.0 | 10.0 | 1.0 | 1.0 | — | — | 10.0 | 1.0 |
| Scratch Resistance (after 24 hrs.) | ◎ | ○ | Δ | ◎ | ◎ | X | X | ○ | ◎ |
| Sunscreen resistance | ◎ | X | ◎ | Δ | ◎ | X | X | Δ | ◎ |
| Moisture resistance | ○ | Δ | ○ | ○ | ○ | X | X | ○ | ○ |
| Wear resistance | ◎ | ○ | ◎ | ◎ | ◎ | X | X | ○ | ◎ |

※ Valuation criteria: Excellent [◎], Good [○], Normal [Δ], Poor [X]

The above Comparative Ex. 1 represents the composition similar to Example 1, but used polyester polyol instead of the branched polyester resin.

The above Comparative Ex. 2 and Comparative Ex. 3 represent the composition similar to Example 1, but used one curing agent alone.

The above Comparative Ex. 4 represents the composition similar to Example 1, but without using 2,4-pentanedione.

The above Comparative Ex. 5 represents the composition similar to Example 1, but without using the reaction catalyst, and the Comparative Ex. 6 represents the composition similar to Example 1, but without using the reaction catalyst or 2,4-pentanedion.

The above Comparative Ex. 7 and Comparative Ex. 8 represent compositions similar to Example 1, but using small or large amounts of catalyst for reaction, respectively.

The experiments were carried out under ASTM D 412 standard, and at first, Dumbell-type specimens were prepared, marked 20.0 mm Gauge (L0) on a specimen of ISO 527-3 5 type, and then left for 10 minutes in the extended state of 100%, and then removed from the grip, and left on a flat place. Then, the distance (L1) between Gauges was determined again, and the recovery time was identified and the elastic recovery rate calculated. The calculation formula is as follows:

$$\text{Elasticity recovering rate}(\%) = 100 - \frac{(L_1 - L_2)}{L_0} \times 100$$

TABLE 3

| Pot life | Ex. 1 (Sec.) | Comparative Ex. 1 (Sec.) | Comparative Ex. 2 (Sec.) | Comparative Ex. 3 (Sec.) | Comparative Ex. 4 (Sec.) | Comparative Ex. 5 (Sec.) | Comparative Ex. 6 (Sec.) | Comparative Ex. 7 (Sec.) | Comparative Ex. 8 (Sec.) |
| --- | --- | --- | --- | --- | --- | --- | --- | --- | --- |
| Initial | 11.20 | 11.25 | 11.15 | 11.30 | 11.25 | 11.30 | 11.20 | 11.15 | 11.30 |
| 0.5 hr | 11.25 | 11.25 | 11.20 | 11.30 | 11.30 | 11.30 | 11.25 | 11.20 | 11.30 |
| 1.0 hr | 11.60 | 11.80 | 11.30 | 11.80 | 14.70 | 11.60 | 11.50 | 11.20 | 11.55 |
| 2.0 hrs | 11.70 | 12.00 | 11.50 | 12.10 | 18.10 | 11.70 | 11.70 | 11.60 | 12.50 |
| 3.0 hrs | 11.90 | 12.20 | 11.90 | 12.50 | Gel | 11.75 | 11.85 | 12.10 | 16.70 |

A pot life (Pot stability) generally refers to the time that keeps the fluidity of a paint suitable for use without gelation, hardening, etc. after its original package has been opened or after mixing components (e.g., more than two package type paint components) to use the paint.

A pot life in the present invention was determined as a viscosity change over time by using a pod cup #4 after mixing the compositions in the above Table 1 and then standing at a room temperature (25° C.) and, the results are set forth in the above Table 3.

As demonstrated in the above Tables 2 and 3, Ex. 1 obtained the results that all the physical properties were excellent, and since the viscosity change was not great over time after mixing the curing agent, it was determined that the workability was secured.

The above Comparative Ex. 1 used polyester polyol instead of the branched polyester resin, and, thus, the elasticity recovering time was considerably longer and the physical properties, such as a sunscreen resistance, and the like were decreased.

The above Comparative Ex. 2 used the curing agent-1 alone and physical properties were good, but the elasticity recovering rate and scratch resistance were somewhat decreased.

The above Comparative Ex. 3 used the curing agent-2 alone and an excellent elasticity recovering rate and scratch resistance were obtained, but the sunscreen resistance was somewhat decreased.

The above Comparative Ex. 4 demonstrated an elasticity recovering rate, scratch resistance and film physical properties about equivalent to those in Ex. 1, but upon determining the pot life, the viscosity of the paint was rapidly increased after a lapse of 0.5 hr.

The above Comparative Ex. 5 and Comparative Ex. 6 were dried for 30 min at 80° C. but did not form a film to the level sufficient to investigate the physical property (i.e. did not adequately cure). Therefore, the need to use a catalyst was demonstrated.

The above Comparative Ex. 7 used an amount of the reaction catalyst smaller than that in Example 1. As shown, since a sufficient urethane reaction did not occur, it was demonstrated that the elasticity recovering time was somewhat longer, and the physical properties were decreased as a whole.

The above Comparative Ex. 8 used an excess amount of the reaction catalyst compared to that in Ex. 1, and the physical properties of the paint film was about equivalent to that of Ex. 1. However, it was determined that the viscosity was rapidly increased after 3 hr of the pot life. This demonstrated that although 2,4-pentanedione was used with the reaction catalyst, if the content of the catalyst is more than 0.7% by weight, controlling the pot life became difficult.

As mentioned above, when the mixture of a branched polyester resin, curing agent-1, and curing agent-2, being the multifunctional curing agent, was used, a paint composition having excellent physical properties could generally be obtained. Further, when a certain amount of the reaction catalyst was used with the reaction retardant, 2,4-pentanedion, a stable viscosity was maintained at room temperature and, thus, controlling the pot life was possible. Further, the curing rate was increased under a predetermined drying condition and, thus, the physical property was greatly improved.

Figure 2:
FIG. 2 is a surface photograph of the specimen of FIG. 1 after 24 hours has elapsed.

FIG. 1 is a surface photograph of a specimen to which the paint composition of the present invention was applied wherein a scratch was made artificially; and FIG. 2 is a surface photograph of that specimen after 24 hours had elapsed.

As shown, it was demonstrated that the scratch (200) which was artificially formed on the specimen (100) to which the paint composition of the present invention was applied and fully dried, was removed after 24 hours. Based on this, an excellent scratch self-recovering performance of the paint composition of the present invention was confirmed.

As above, while the invention was described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. A fast-drying scratch self-recovering paint composition having an extended pot life, which comprises:
    about 30~40% by weight of a branched polyester resin;
    about 30~40% by weight of an acryl polyol resin;
    about 0.2~0.5% by weight of a reaction catalyst; and
    about 0.99~9.0% by weight of a reaction retardant,
        wherein wt % are based on the total weight of the paint composition.

2. The scratch self-recovering paint composition according to claim 1, wherein the reaction catalyst is a dibutyl tin dilaurate.

3. The scratch self-recovering paint composition according to claim 1, wherein the reaction retardant is a diketone compound.

4. The scratch self-recovering paint composition according to claim 3, wherein the diketone compound is a 2,4-pentanedione.

5. The scratch self-recovering paint composition according to claim 1, wherein the paint composition further comprises about 20~30% by weight of a curing agent, based on the total weight of the paint composition.

6. The scratch self-recovering paint composition according to claim 5, wherein the curing agent comprises a mixture of hexamethylene diisocyanate trimer and hexamethylene diisocyanate allophanate trimer mixed at a weight ratio of about 1:1~3.

7. The scratch self-recovering paint composition according to claim 5, wherein the paint composition further comprises about 0.5~2% by weight of a photostabilizer, based on the total weight of the paint composition.

8. The scratch self-recovering paint composition according to claim 7, wherein the photostabilizer comprises Tinuvin 400 and Tinuvin 292 mixed together at a weight ratio of about 2~3:1.

* * * * *